UNITED STATES PATENT OFFICE.

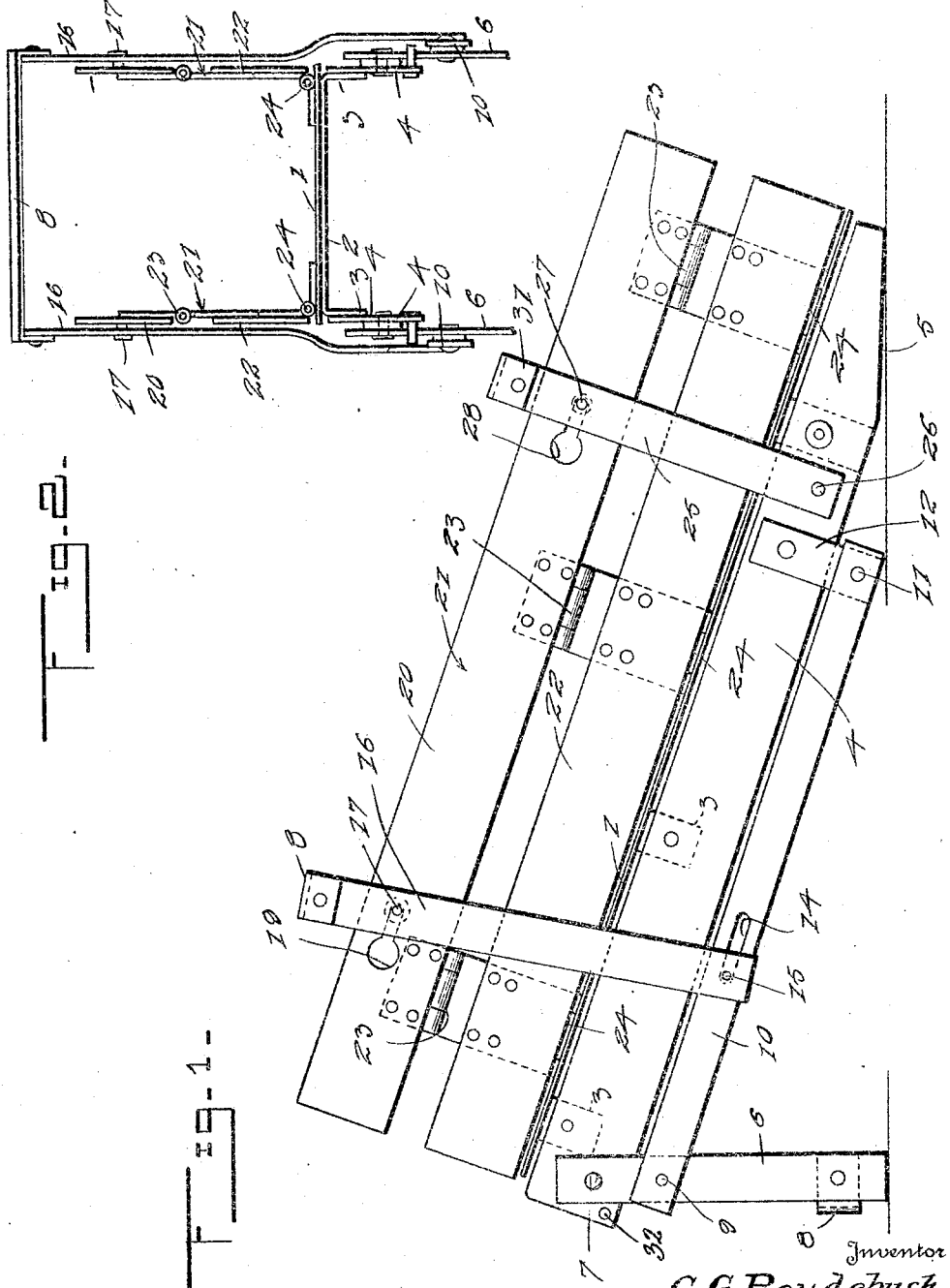

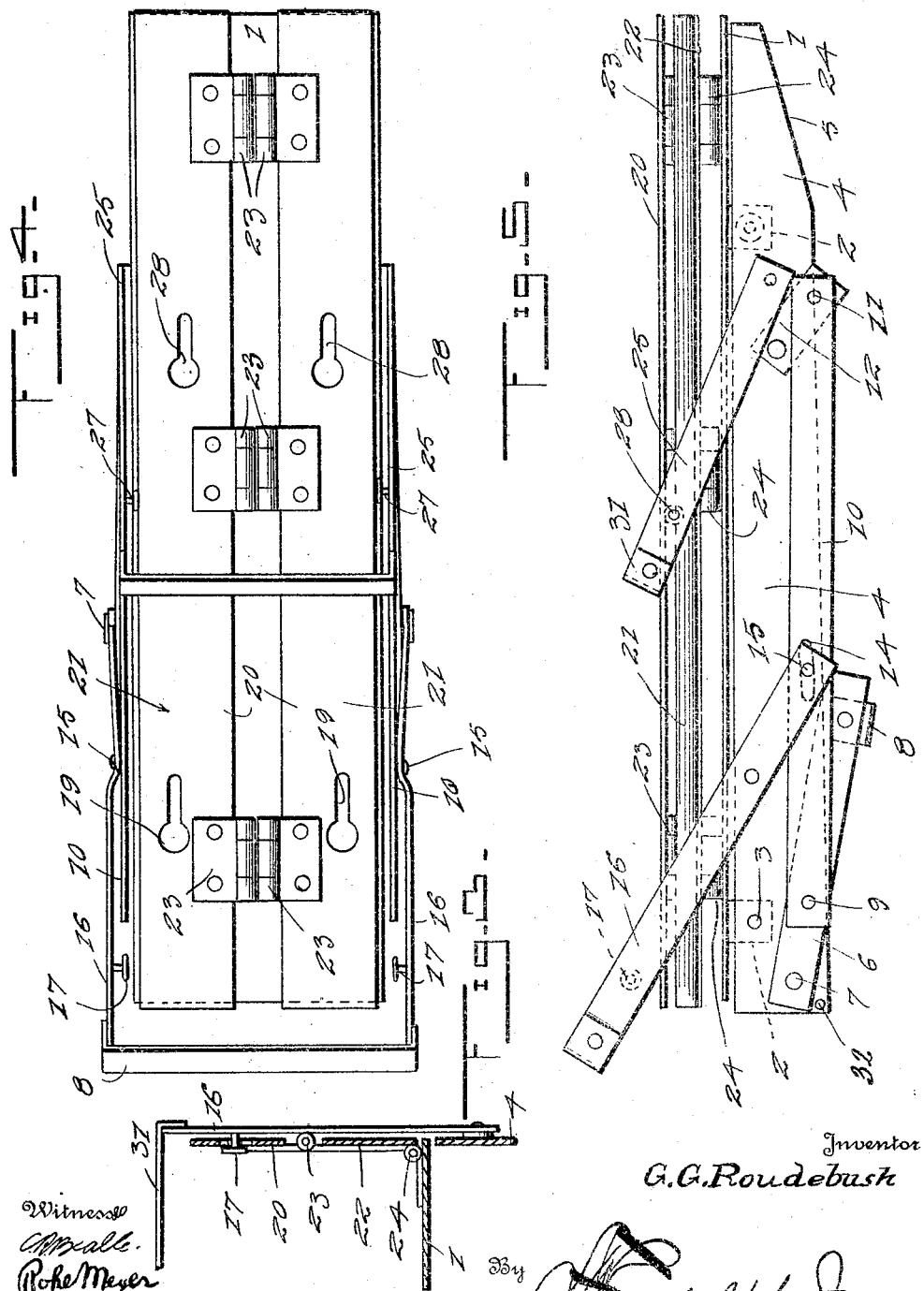

GEORGE G. ROUDEBUSH, OF OSHKOSH, NEBRASKA.

ANIMAL-CHUTE.

1,212,112.　　　Specification of Letters Patent.　　Patented Jan. 9, 1917.

Application filed May 11, 1916. Serial No. 96,900.

*To all whom it may concern:*

Be it known that I, GEORGE G. ROUDEBUSH, a citizen of the United States, residing at Oshkosh, in the county of Garden and State of Nebraska, have invented certain new and useful Improvements in Animal-Chutes; and I do hereby declare the following to be a full, clear, and exact description of the invention, such as will enable others skilled in the art to which it appertains to make and use the same.

This invention relates to a chute which is particularly designed for facilitating the loading or unloading of domestic animals such as hogs, cows or the like into or from wagons, railway cars or the like and the primary object of the invention is to provide a chute which is collapsible, so that it may be folded to assume a compact form for the purpose of transportation.

A further object of this invention is to provide in a cattle chute structure as specified, a platform having sides hingedly connected thereto, which sides are composed of hingedly connected sections, and to provide supporting legs which are pivotally mounted beneath the floor of the chute and have a substantially U-shaped bracket connected thereto which is adapted for detachable connection with the hingedly connected sides of the chute for holding the sides in a rigid position, and which U-shaped member is connected to the supporting arms of the legs of the chute so that it will be moved into a folded position upon the folding of the legs.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved animal chute showing the same in an extended operative position. Fig. 2 is an end view of the chute. Fig. 3 is a fragmentary section through the chute. Fig. 4 is a plan view of the chute in a folded position, and Fig. 5 is a side elevation of the chute in a folded position.

Referring more particularly to the drawings, 1 designates the bottom or platform of the animal chute, which has a plurality of supporting bars 2 attached to its under surface. The bars 2 have their outer ends 3 bent downwardly and attached in any suitable manner to the depending side boards 4. The rear lower edges of the side boards 4 are cut away as shown at 5 for resting upon the upper surface of the ground when the chute is supported in an inclined operative position as shown in Fig. 1 of the drawings, by the supporting legs 6. The supporting legs 6 are pivotally connected as shown at 7 to the forward ends of the side boards 4 and they have their lower ends connected by a suitable brace 8. Each of the legs 6 is pivotally connected as shown at 9 to a supporting arm 10 which arm is in turn pivotally connected as at 11 to a depending bracket or plate 12 which is pivotally connected to one of the side boards. The arms 10 are provided with slots 14 formed intermediate their ends in which slots are slidably seated pins 15. The pins 15 are carried by the lower ends of a substantially inverted U-shaped arm 16. The arm 16 has headed pins 17 carried by its legs, a short distance downwardly from their upper ends which pins are adapted for removable insertion in key hole slots 19 carried by the upper section 20 of the side board structure 21 of the chute.

The side board structures 21 of the chute each comprise sections 20 and 22 which are hingedly connected by means of hinges 23 of ordinary construction. The lowermost sections 22 of the sides of the chute are hingedly connected by means of hinges 24 to the bottom or platform 1 of the chute. A substantially U-shaped arm or bracket 25 has the lower ends of its legs pivotally connected to the side boards 4 as shown at 26, and it extends upwardly and across the top of the side board structures 21 of the chute when the chute is in an extended position. The legs of the U-shaped arm 25 have headed pins 27 carried thereby which are provided for removable insertion through key hole slots 28 formed in the top sections or boards 20 for rigidly connecting the hinged side board structures 21 to the U-shaped arm 26, for assisting the arm 16 in supporting the side boards rigidly in vertical positions.

When the chute is not in use for the purpose of facilitating the loading or unloading of hogs, cattle or like animals, it may be folded into the positions illustrated in Figs. 4 and 5 of the drawings, for convenience of transportation, at which time the legs 6 are folded inwardly so that they will abut the outer surface of the depending side boards 4 while the arm 10 abuts the outer surface of the legs 6 and extend rearwardly therealong close to the depending side boards 4, as clearly shown in Fig. 5 of the drawings. The pivotal movement of the legs 6, upwardly and rearwardly, into a folded position will move the U-shaped member 16 forwardly, so that the heads of the pins 17 will aline with the enlarged portions of the key hole slots 19, after which the upper ends of the side board structures are moved inwardly for removing the headed pins 17 from the key hole slots 19. The U-shaped member 25 is then moved forwardly so that the pins 27 carried thereby may be removed from the key hole slots 28, and the side board sections are folded upon themselves as illustrated in Figs. 4 and 5 of the drawings and upon the upper surface of the platform 1. The further movement of the legs upwardly toward the under surface of the platform or floor 1 of the chute will move the U-shaped arm 16 downwardly into the position illustrated in Fig. 5. The U-shaped member 25 is then folded downwardly, so that the upper bight portion 31 will rest across the top of the folded sections 20 and 22 of the side board structures 21 and hold them in place against accidental pivotal or hinged movement. Stop pins 32 are carried by the depending side boards 4 and are provided for limiting the pivotal movement of the supporting legs of the animal chute.

In reducing the invention to practice, certain minor features of construction, combination and arrangement of parts may necessitate alterations to which the patentee is entitled provided such alterations are comprehended within the scope of what is claimed.

What is claimed is:—

1. In a hog chute structure, the combination, of a platform, depending side boards connected to said platform, upstanding side boards hingedly connected to said platform, and a pair of supporting legs pivotally connected to said depending side boards and adapted for downwardly extending positions with respect to the side boards for supporting one end of the platform at a higher elevation than the other end, arms pivotally connected to said supporting legs, and a substantially inverted U-shaped member connected to said arms and adapted for connection with the hinged upstanding side boards for holding them rigidly in place.

2. In a hog chute structure, the combination, of a platform, depending side boards connected to said platform, upstanding side boards hingedly connected to said platform, and a pair of supporting legs pivotally connected to said depending side boards and adapted for downwardly extending positions with respect to the side boards for supporting one end of the platform at a higher elevation than the other end, arms pivotally connected to said supporting legs, and a substantially inverted U-shaped member connected to said arms and adapted for connection with the hinged upstanding side boards for holding them rigidly in place, said substantially U-shaped member adapted for pivotal movement into a folded position upon upward pivotal movement of said legs toward said platform, and a second substantially U-shaped member pivotally connected to said depending side boards and adapted for detachable connection with said upstanding hinged side boards for holding them rigidly in place.

3. In a hog chute structure, the combination, of a platform, depending side boards connected to said platform, supporting legs pivotally connected to the forward end of said depending side boards, arms pivotally connected to said legs, upstanding side boards hingedly connected to said platform, a substantially inverted U-shaped member pivotally connected to said arms intermediate of their ends, headed pins carried by said inverted U-shaped member, said hinged upstanding side boards provided with key hole slots for receiving said headed pins for connecting said hinged side boards to said inverted U-shaped member when said supporting legs are in an extended supporting position, said U-shaped member being connected to said arms so that it will be moved downwardly toward said platform upon pivotal movement of said legs upwardly toward the platform.

4. In a hog chute structure, the combination, of a platform, depending side boards connected to said platform, supporting legs pivotally connected to the forward end of said depending side boards, arms pivotally connected to said legs, upstanding side boards hingedly connected to said platform, a substantially inverted U-shaped member pivotally connected to said arms intermediate of their ends, headed pins carried by said inverted U-shaped member, said hinged upstanding side boards provided with key hole slots for receiving said headed pins for connecting said hinged side boards to said inverted U-shaped member when said supporting legs are in an extended supporting position, said U-shaped member being connected to said arms so that it will be moved downwardy toward said platform upon pivotal movement of said legs upwardly toward the platform, and stop pins carried by said depending side boards for limiting the pivotal movement of said supporting legs.

5. In a hog chute structure, the combination, of a platform, depending side boards connected to said platform, supporting legs pivotally connected to the forward end of said depending side boards, arms pivotally connected to said legs, upstanding side boards hingedly connected to said platform, a substantially inverted U-shaped member pivotally connected to said arms intermediate of their ends, headed pins carried by said inverted U-shaped member, said hinged upstanding side boards provided with key hole slots for receiving said headed pins for connecting said hinged side boards to said inverted U-shaped member when said supporting legs are in an extended supporting position, said U-shaped member being connected to said arms so that it will be moved downwardly toward said platform upon pivotal movement of said legs upwardly toward the platform, and stop pins carried by said depending side boards for limiting the pivotal movement of said supporting legs, each of said side boards composed of a plurality of hingedly connected sections.

6. In a hog chute structure, the combination, of a platform, depending side boards connected to said platform, supporting legs pivotally connected to the forward end of said depending side boards, arms pivotally connected to said legs, upstanding side boards hingedly connected to said platform, a substantially inverted U-shaped member pivotally connected to said arms intermediate of their ends, headed pins carried by said inverted U-shaped member, said hinged upstanding side boards provided with key hole slots for receiving said headed pins for connecting said hinged side boards to said inverted U-shaped member when said supporting legs are in an extended supporting position, said U-shaped member being connected to said arms so that it will be moved downwardly toward said platform upon pivotal movement of said legs upwardly toward the platform, and stop pins carried by said depending side boards for limiting the pivotal movement of said supporting legs, each of said side boards composed of a plurality of hingedly connected sections, a second substantially inverted U-shaped member pivotally connected to said depending side boards, headed pins carried by said second inverted U-shaped member, the upper sections of said side boards being provided with key hole slots for receiving the headed pins carried by said second named U-shaped member.

In testimony whereof I affix my signature in presence of two witnesses.

GEORGE G. ROUDEBUSH.

Witnesses:
G. E. MELVIN,
E. C. SPILLMAN.

Copies of this patent may be obtained for five cents each, by addressing the "Commissioner of Patents, Washington, D. C."